US008933987B2

(12) United States Patent
Kiyama

(10) Patent No.: US 8,933,987 B2
(45) Date of Patent: Jan. 13, 2015

(54) CONTENT REPRODUCING APPARATUS AND RECORDING MEDIUM FOR SWITCHING GRAPHICS AND VIDEO IMAGES FROM 2D TO 3D

(75) Inventor: Jiro Kiyama, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 633 days.

(21) Appl. No.: 13/132,009

(22) PCT Filed: Aug. 20, 2009

(86) PCT No.: PCT/JP2009/064539
§ 371 (c)(1),
(2), (4) Date: Jun. 29, 2011

(87) PCT Pub. No.: WO2010/064472
PCT Pub. Date: Jun. 10, 2010

(65) Prior Publication Data
US 2011/0261157 A1    Oct. 27, 2011

(30) Foreign Application Priority Data

Dec. 1, 2008  (JP) ................................ 2008-306533

(51) Int. Cl.
*H04N 9/47*      (2006.01)
*H04N 13/00*    (2006.01)
*H04N 13/04*    (2006.01)

(52) U.S. Cl.
CPC ....... *H04N 13/0044* (2013.01); *H04N 13/0055* (2013.01); *H04N 13/0048* (2013.01); *H04N 13/0454* (2013.01); *H04N 13/0066* (2013.01)
USPC .......................................................... 348/43

(58) Field of Classification Search
CPC . G11B 20/1251; G11B 27/034; H04N 9/8205
USPC .......................................................... 348/43
See application file for complete search history.

(56) References Cited

U.S. PATENT DOCUMENTS 6,573,819 B1     6/2003  Ohshima et al.
8,089,507 B2 *  1/2012  Ikeda et al. ..................... 348/43
(Continued)

FOREIGN PATENT DOCUMENTS

JP     2005-252989     9/2005
JP     2006-155384     6/2006
(Continued)

*Primary Examiner* — Dave Czekaj
*Assistant Examiner* — Leron Beck
(74) *Attorney, Agent, or Firm* — Edwards Wildman Palmer LLP; David G. Conlin; Steven M. Jensen

(57) ABSTRACT

A contents reproduction device can concurrently switch a video image and a graphics image from 2D to 3D. A contents reproduction device includes a program execution unit that outputs a graphics image used for 2D to a left graphics plane and outputs a graphics image used for 3D to left and right graphics planes; an AV reproduction unit outputs a video image used for 2D to the left video plane and outputs a video image used for 3D to the left and right video planes; and a switch unit outputs a first synthesized image of images stored at the left video plane and the left graphics plane at the 2D reproduction time and switches to output a second synthesized image of images stored at the right video plane and the right graphics plane and the first synthesized image at the 3D reproduction time.

2 Claims, 19 Drawing Sheets

(56) References Cited

U.S. PATENT DOCUMENTS

| | | |
|---|---|---|
| 2003/0095177 A1 | 5/2003 | Yun et al. |
| 2008/0018731 A1 | 1/2008 | Era |
| 2008/0240230 A1* | 10/2008 | Oxman et al. ........... 375/240.01 |
| 2010/0260481 A1* | 10/2010 | Ogawa et al. .................. 386/95 |

FOREIGN PATENT DOCUMENTS

| | | |
|---|---|---|
| JP | 2008-067393 | 3/2008 |
| WO | 97/32437 | 9/1997 |
| WO | 2006/033046 | 3/2006 |
| WO | 2009/077929 | 6/2009 |

* cited by examiner

```
TITLE INFORMATION FILE {
        PlayListFileName
        ProgramFileName
}
```

(B)

```
PLAYLIST FILE {
        NumOfClips
        for ( i=0; i<NumOfClips; i++ ){
                ClipFileName[i]
                Dimension[i]
        }
}
```

FIG. 10

```
PLAYLIST FILE {
        NumOfClips
        for ( i=0; i<NumOfClips; i++ ){
                ClipFileName[i]
                Dimension[i]
                PrepTime[i]
        }
}
```

CONTENT REPRODUCING APPARATUS AND RECORDING MEDIUM FOR SWITCHING GRAPHICS AND VIDEO IMAGES FROM 2D TO 3D

TECHNICAL FIELD

The present invention relates to a content reproducing apparatus, a reproducing method, a program, and a recording medium capable of 3D reproduction.

BACKGROUND ART

Recently, movie theaters in US suffer from reduction of visitors and increasingly introduce 3D (Three Dimension) video technology. This is intended to appeal an attractive feature specific to the movie theaters but not enjoyed in home theaters, and it is reported that the number of visitors has actually increased in the movie theaters that introduced the technology.

A method of utilizing binocular disparity is used, and videos for right-eye and left-eye are projected in a spatially divided or frequency-divided manner and are separated to left and right videos by special eyeglasses.

On the other hand, it is considered for future expansion to introduce the 3D video technology into consumer devices while maintaining compatibility with current DVD.

Patent Document 1 describes that left-eye and right-eye videos are recorded in an interleaved manner such that only the left-eye video is referenced from management information of existing DVD. Extended management information is added at the same time such that the videos for both eyes are referenced from the extended management information. This enables a smooth transition to 3D while maintaining the compatibility with existing DVD players.

Another feature of Patent Document 1 is that an arrangement exists for smoothly switching between a section provided with 3D video and a section only having 2D video. The primary point of this mechanism will be described using a video disc player 200 shown in FIG. 19.

The video disc player 200 is made up of an optical disc 210, a data acquiring portion 220, an AV (Audio Visual) reproducing portion 230, a left video output portion 240, a right video output portion 250, a switching portion 260, and a control portion 270.

The optical disc 210 basically has a DVD (Digital Versatile Disk) format subjected to the following expansions. As described above, a 3D video section has right-eye video and left-eye video recorded in an interleaved manner. The extended management information is also recorded along with stereoscopic video arrangement information for smoothly switching between 3D video and 2D video.

The data acquiring portion 220 reads AV stream and management information from the optical disc 210 in accordance with instructions from the control portion 270 and the AV reproducing portion 230.

The AV reproducing portion 230 decodes and outputs the read AV stream. The decoded video is output to the left video side (left-eye video side) of FIG. 19 in the case of 2D video and, the decoded video is output to both the left video side and the right video side (left-eye video side) in the case of 3D video.

The switching portion 260 switches and outputs left video output or right video output from the AV reproducing portion 230 to the right video output portion 250 in accordance with instruction from the control portion 270. This is for the purpose of supplying the right video output portion 250 with the left video output (left-eye output) in the case of 2D video since no right video output (right-eye output) exists.

The left video output portion 240 and the right video output portion 250 output the left-eye video and the right-eye video, respectively, to the outside.

The control portion 270 controls the switching portion 260 at the timing specified in advance by a content creator based on the stereoscopic video arrangement information read through the data acquiring portion 220, and thereby switches from the 2D video to the 3D video at appropriate timing.

PRIOR ART DOCUMENT

Patent Document

Patent Document 1: Japanese Laid-Open Patent Publication No. 2008-67393

SUMMARY OF THE INVENTION

Problems to be Solved by the Invention

Recently, the Blu-ray disc ROM standard (hereinafter, abbreviated as BD-ROM standard) called next generation DVD is becoming widespread. The BD-ROM standard is characterized by high-quality video/audio as well as flexible graphics function using the Java (registered trademark) language.

Although not supporting 3D video at present, it is expected that the BD-ROM standard is requested to support 3D video in the future. On such occasion, it may be essential to support not only the video images acquired by decoding but also graphic images using the Java (registered trademark) language in 3D.

Although a technique related to control of 3D contents including graphics is not disclosed at present, it is contemplated for enabling the 3D display of graphics that a left-eye graphic image is output to both left-eye and right-eye video output portions for the 2D display and that a graphics source is switched so as to output a right-eye graphic image from the right-eye video output portion when the 2D display is switched to the 3D display, as is the case with video images (in the same way as FIG. 19). However, it takes time to draw a graphic image using the Java (registered trademark) language longer than decoding. Therefore, if the source of graphics to the right-eye video output portion is simply switched as described above at the same time as changing video contents from 2D to 3D, no graphic image is output from, for example, the right-eye video output portion until the right-eye graphic image is completely drawn. In this case, since only the video images are 3D and the overlapping graphic images are 2D, a user experiences discomfort.

It is an object of the present invention to provide a content reproducing apparatus, a control method, a program, and a recording medium capable of switching a video image and a graphic image at the same time from 2D to 3D when switching from 2D to 3D.

Means for Solving the Problems

In order to solve the above problems, a first technical means of the present invention is a content reproducing apparatus comprising a data acquiring portion that acquires a program and video data from reproduction data; a first video plane and a second video plane that store video images; a first graphics plane and a second graphics plane that store graphic images; a program executing portion that executes the program to generate the graphic images, and outputs the graphic image for 2D (dimension) output to the first graphics plane and the graphic image for 3D output to each of the first and the second graphics planes; a decoding portion that decodes the video data to output the video image for 2D output to the first video plane and the video image for 3D output to each of the first and the second video planes; a first combining portion that combines images stored in the first video plane and the first graphics plane; a second combining portion that combines images stored in the second video plane and the second graphics plane; and a switching portion that switches the output so as to output a combined image of the first combining portion at the time of reproduction of 2D image data and to output a combined image of the first combining portion and a combined image of the second combining portion at the time of reproduction of 3D image data, wherein the switching portion executes the switching based on completion of generation of 3D graphics for one screen in the program executing portion when the reproduction data is changed from 2D image data to 3D image data.

A second technical means of the present invention is the content reproducing apparatus of the first technical means, comprising a time information acquiring portion that acquires time information related to an expected generation time of the 3D graphics for one screen, wherein when the video data is switched from the 2D image data to the 3D image data, the program executing portion starts generation of the graphic image for 3D output before the time of the switching by the expected generation time, and the switching portion executes the switching based on the completion of generation of 3D graphics by the program executing portion and the switching of the output video image in the decoding portion from the video image for 2D output to the video image for 3D output.

A third technical means of the present invention is the content reproducing apparatus of the second technical means, wherein the time information acquiring portion acquires the time information from the reproduction data.

A fourth technical means of the present invention is a reproducing method of content data which simultaneously include 2D image data and 3D image data mixed, comprising acquiring a program and video data from reproduction data; executing the program to generate graphic images and outputting the graphic image for 2D (dimension) output to a first graphics plane and the graphic image for 3D output to each of the first and second graphics planes; decoding the video data to output a video image for 2D output to a first video plane and a video image for 3D output to each of the first and second video planes; outputting a combined image of images stored in the first video plane and the first graphics plane at the time of reproduction of 2D image data; and outputting a combined image of images stored in the second video plane and the second graphics plane in accordance with completion of generation of 3D graphics of one screen when the reproduction data is changed from 2D image data to 3D image data.

A fifth technical means of the present invention is a program running on a computer to execute the reproducing method of the fourth technical means.

A sixth technical means of the present invention is a recording medium recording the program of the fifth technical means in a computer readable manner.

A seventh technical means of the present invention is a recording medium applied to the content reproducing apparatus of the third technical means, wherein the recording medium records video data which simultaneously includes 2D image data and 3D image data and a program that generates graphic images for 2D and 3D outputs, the 2D image data and the 3D image data are recorded by being divided into a predetermined unit, and the time information related to an expected generation time necessary for generating a graphic image for 3D output displayed along with a video image for 3D output in the recording section by the program is recorded in a 3D image data recording section switched to the 3D image data from a 2D image data recording section.

Effect of the Invention

According to the present invention, reproduction control can be performed for 3D contents including graphic images and especially, when switching from 2D to 3D, a video image and a graphic image can be reproduced in 3D at the same time.

BRIEF DESCRIPTION OF DRAWINGS

FIG. 3 is an explanatory diagram of data configurations of a title information file and a playlist file in the first embodiment of the present invention.

FIG. 10 is an explanatory diagram of a data configuration of a playlist file in a second embodiment of the present invention.

MODES FOR CARRYING OUT THE INVENTION

First Embodiment

A content reproducing apparatus according to an embodiment of the present invention will now be described with reference to the drawings. Although the content reproducing apparatus will be described by taking an example of a video disc player in the following description, the present invention is not limited thereto and may be any form such as PC (Personal Computer).

<Overall System Configuration>

Figure 1:
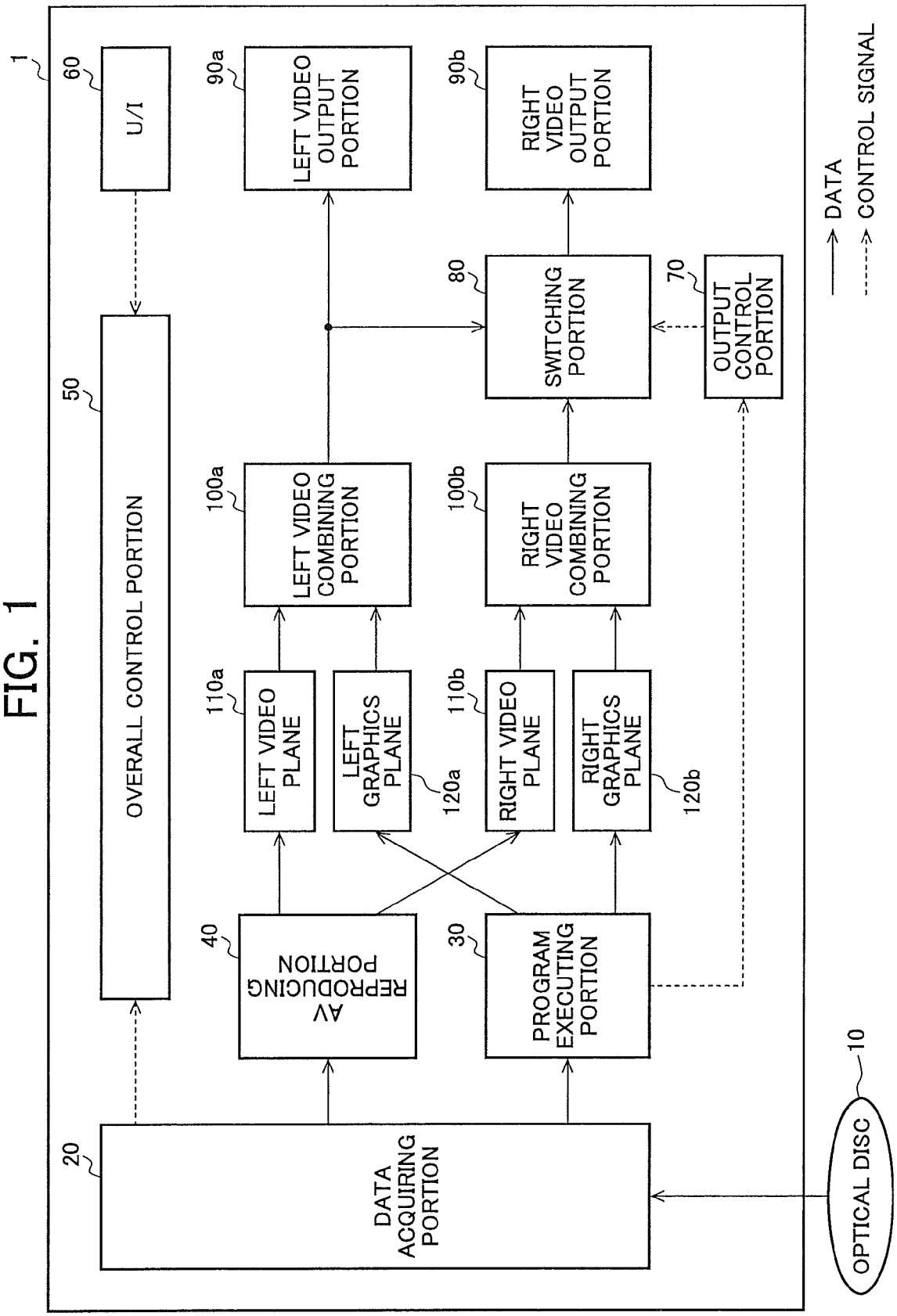
FIG. 1 is a block diagram of a general configuration in a first embodiment of the present invention.

FIG. 1 depicts one configuration example of a video disc player according to this embodiment.

A video disc player 1 is a reproducing apparatus of content data in which 2D image data (image data for video images and image data for graphic images) and 3D image data are included simultaneously and is made up of an optical disc 10, a data acquiring portion 20, a program executing portion 30, an AV reproducing portion 40, an overall control portion 50, a U/I 60, an output control portion 70, a switching portion 80, a left video output portion 90a, a right video output portion 90b, a left video combining portion 100a, a right video combining portion 100b, a left video plane 110a, a right video plane 110b, a left graphics plane 120a, and a right graphics plane 120b.

The optical disc 10 is a large-capacity optical disc such as BD-ROM and uses UDF (Universal Disc Format) as a file system for managing data. A file directory configuration will be described later.

The data acquiring portion 20 reads various data from the optical disc 10 that records programs, reproduction data including AV data, etc., in accordance with instructions from the overall control portion 50, the AV reproducing portion 40, and the program executing portion 30.

The program executing portion 30 executes a program read from the optical disc 10 in accordance with instruction from the overall control portion 50 and writes generated graphics into the left graphics plane 120a and the right graphics plane 120b depending on the contents of the program. As described later, it is possible to communicate the information between the program executing portion 30 and the output control portion 70.

The AV reproducing portion 40 decodes AV data read from the optical disc 10. The decoded video is output only to the left video plane 110a in the case of 2D AV data or is output to both the left video plane 110a and the right video plane 110b in the case of 3D AV data. As described later, a function is also included for giving a notification of switching of AV data between 2D and 3D to the output control portion 70.

The overall control portion 50 generally controls the video disc player 1 in accordance with user's operation transmitted from the U/I 60. The overall control portion 50 reads a title information file described later from the optical disc 10 to perform control such as activation of the AV reproducing portion 40 and the program executing portion 30.

The U/I 60 accepts user's operation on a remote controller etc., and transmits the accepted result to the overall control portion 50.

The switching portion 80 switches whether video output to the right video output portion 90b is the video from the left video combining portion 100a or the video from the right video combining portion 100b, in accordance with instruction from the output control portion 70.

The output control portion 70 controls the switching portion 80 based on control signals from the program executing portion 30 and the AV reproducing portion 40.

The left video output portion 90a and the right video output portion 90b output a left-eye video (left video) and a right-eye video (right video), respectively, to an external displaying apparatus (not depicted).

The left video combining portion 100a combines images memorized (stored) in the left video plane 110a and the left graphics plane 120a. The right video combining portion 100b similarly combines images stored in the right video plane 110b and the right graphics plane 120b.

The left video plane 110a and the right video plane 110b are image buffer memories for retaining video images to be displayed for left eye and right eye, respectively.

The left graphics plane 120a and the right graphics plane 120b are image buffer memories for retaining graphic images to be displayed for left eye and right eye, respectively. Double buffering technique is used for drawing graphics to the left graphics plane 120a and the right graphics plane 12b and each of the planes 120a has a front buffer and a back buffer. The program executing portion 30 (by means of a program executed by the program executing portion 30) draws graphics into the back buffer and, after the entire graphics are drawn, the graphics are collectively transferred from the back buffer to the front buffer that supplies output. Therefore, the state during the drawing cannot be seen.

<File Directory Configuration>

Figure 2:
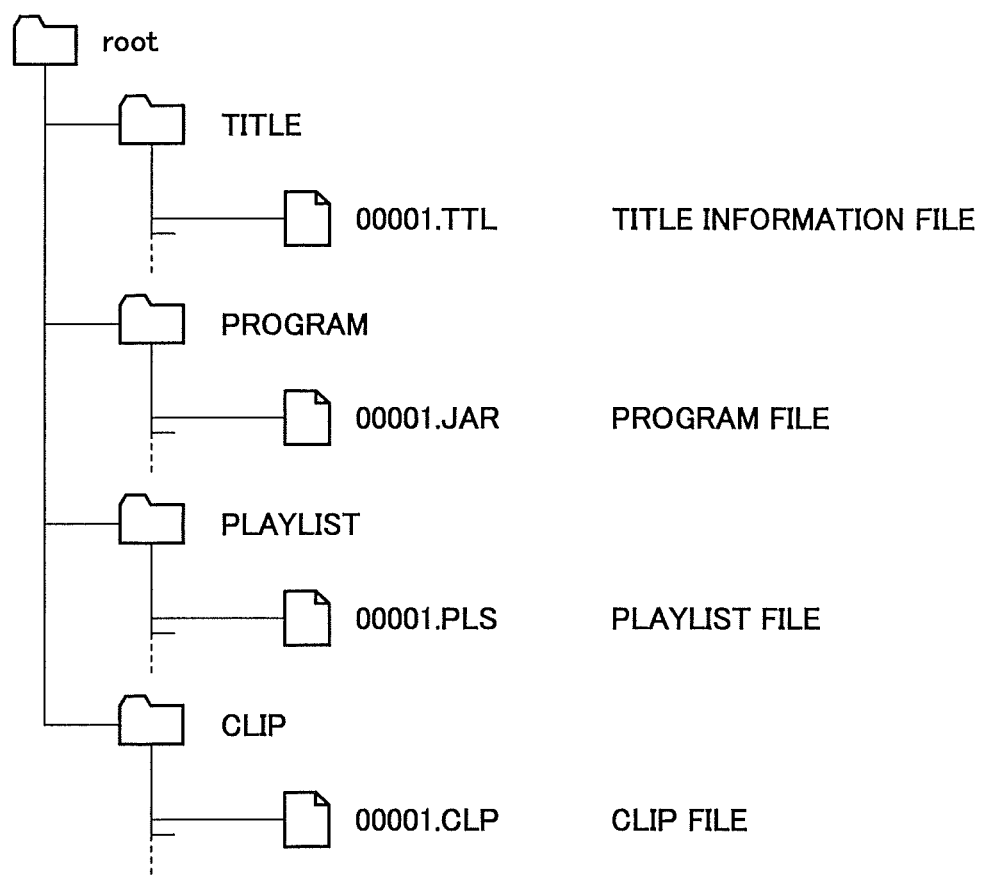
FIG. 2 is an explanatory diagram of a file directory configuration in the first embodiment of the present invention.

FIG. 2 is an explanatory diagram of a file directory configuration for managing various data stored in the optical disc 10. The files will hereinafter briefly be described.

A clip file is a file that stores AV data. 2D video and 3D video are not mixed in one clip file and are separated by a boundary and stored in different clips in such a case.

A playlist file is a file that stores a playlist and attribute information related to AV data referenced from the playlist. The playlist is the information which indicates that from which portion to which portion of the AV data are reproduced in what order.

A program file is a file that stores compiled Java (registered trademark) byte codes.

A title information file is a file that stores information related to titles in the optical disc 10. The stored information includes the playlist files used for the titles and reference information for the program file. A file name is set to "00000.TTL" for a title desired to automatically reproduce at the time of insertion of a disc.

<Management Information File>

FIG. 3 is an explanatory diagram of data configurations of the title information file and the playlist file in this embodiment.

The title information file will be described first with reference to FIG. 3(A). The title information file includes a field PlayListFileName and a field ProgramFileName.

The field PlayListFileName is a file name of a file that stores a playlist making up a title corresponding to this file.

The field ProgramFileName is a file name of a file that stores a program making up a title corresponding to this file.

The playlist file will then be described with reference to FIG. 3(B). The playlist file stores NumOfClips, i.e., a field storing the number of clips making up a playlist, and the information regarding the clips just for the number of clips.

The information regarding clips includes a field ClipFile-Name [i] and a field Dimension [i]. "i" indicates what number clip in a playlist the information relates to.

The field ClipFileName [i] stores a file name of an ith clip file in a playlist. The field Dimension [i] indicates whether a video stored in the ith clip file in the playlist is 3D or 2D and, values of 0 and 1 indicate 2D and 3D, respectively.

<Overall Processing>

An overall processing flow of the overall control portion 50 in this embodiment will be described with reference to FIG. 4.

The entire apparatus is initialized in accordance with a power-on instruction from a user through the U/I 60 (S10a) and a file having the file name "00000.TTL" described above is then selected, i.e., a title to be reproduced is selected (S10b).

The selected title information file is then read through the data acquiring portion 20 (S10c).

The title information file is analyzed, an instruction for playlist reproduction is given to the AV reproducing portion 40 along with a filename specified by PlayListFileName (S10d), an instruction for executing a program having a file name specified by ProgramFileName (S10e) is given to the program executing portion 30, and the reproduction of the AV data of the selected title and the drawing of graphics by the program is started. When termination notifications described later arrive from both the AV reproducing portion 40 and the program executing portion 30, i.e., when the reproduction of the title is terminated (S10f), the processing goes back to the selection of a title (S10b) and the title information file specified by the title is selected immediately before the termination of the reproduction of the title.

<Program Execution Processing>

A flow of a program execution processing by the program executing portion 30 in this embodiment will be described with reference to FIG. 5.

A program file specified by the overall control portion 50 is read through the data acquiring portion 20 from the optical disc 10 (S20a).

The program that is read out is activated (S20b) and graphics are drawn in the left graphics plane 120a in the case of 2D reproduction and graphics are drawn in the left graphics plane 120a and the right graphics plane 120b in the case of 3D reproduction based on 2D-3D information described later received via the output control portion 70 from the AV reproducing portion 40. When the program terminates (S20c), a termination notification is given to the overall control portion 50 (S20d). Although this video disc player 1 is characterized by the operation (process) when 2D reproduction is switched to 3D reproduction, the program executing portion 30 and the characteristic operation of the program executed by the executing portion 30 will be described later.

<Playlist Reproduction Processing>

A flow of a playlist reproduction processing by the AV reproducing portion 40 in this embodiment will be described with reference to FIG. 6.

The AV reproducing portion 40 reads a playlist of a title specified and selected by the overall control portion 50 through the data acquiring portion 20 from the optical disc 10 (S30a) to interpret the contents.

The AV reproducing portion 40 initializes a variable i, i.e., an index of a clip to be read to zero (S30b) and executes the following processing while the index is less than the number of clips in this playlist (i<NumOfClips).

The AV reproducing portion 40 starts reading the clip file specified by the field ClipFileName [i] from the optical disc 10 (S30d) and notifies the output control portion 70 of the 2D-3D control information specified by the field Dimension [i] (S30e).

Subsequently, only when i is zero, the AV reproducing portion 40 starts decoding (activates a decoder) (S30f) to sequentially decode the clips of the read clip, and the decoded video is output only to the left video plane 110a in the case of the 2D reproduction and to both the left video plane 110a and the right video plane 110b in the case of the 3D reproduction. It is assumed that the disc 10 stores only left-eye AV data for a 2D clip file and both left-eye and right-eye AV data for a 3D clip file.

After S30e (or after S30f), i is incremented (S30g) and the process jumps to step S30c.

If i is equal to or greater than the number of clips at step S30c (i≥NumOfClips), a termination notification is given to the overall control portion 50 (S30i) after the termination of decoding of the currently decoded clip (S30h).

<2D-3D Switching Processing>

As described above, the video disc player 1 includes the left video combining portion 100a that combines the video in the left video plane 110a and the graphics in the left graphics plane 120a, and the right video combining portion 100b that combines the video in the right video plane 110b and the graphics in the right graphics plane 120b, and can perform switching from 2D to 3D since the output control portion 70 controls the switching portion 80 based on the 2D-3D control information to switch the source of video to the right video output portion 90b between the left video combining portion 100a and the right video combining portion 100b. A feature of this video disc player is that the switching from 2D to 3D is performed after receiving a completion notification of drawing of one screen in the right graphics plane 120b from the program executing portion 30 so as to enable the 3D reproduction of the video concurrently with the graphics. The following description is an example of the processing necessary for this characteristic operation.

The processing in the video disc player 1 at the time of switching between 2D and 3D (the processing after the notification of the 2D-3D control information from the AV reproducing portion 40), more specifically, the processing flow of the program executed in the output control portion 70, the program executing portion 30, and the program executing portion 30 will be described with reference to FIGS. 7 to 9.

First, a processing flow of the output control portion 70 when the notification of the 2D-3D control information is given from the AV reproducing portion 40 will be described with reference to FIG. 7.

The output control portion 70 notifies the program executing portion 30 of the 2D-3D control information received from the AV reproducing portion 40 without change (S40a).

The output control portion 70 manages the current 2D/3D state and refers to the field Dimension [i] of the received 2D-3D control information to check whether the 2D/3D state is changed (S40b). If changed, the output control portion 70 further checks whether the change is from 2D to 3D (S40c).

In the case of the change from 2D to 3D, the output control portion 70 waits for a notification of completion of 3D graphics drawing (described later) from the program executing portion 30 (S40e).

Additionally, the output control portion 70 controls the switching portion 80 to switch the output of the right video output portion 90b from video of the left video combining portion 100b to video of the right video combining portion 100b (S40f).

A processing flow of the program executing portion 30 when the notification of the 2D-3D control information is given from the output control portion 70 will then be described with reference to FIG. 8.

The program executing portion 30 gives the 2D-3D control information sent from the output control portion 70 to the program that is running on the program executing portion 30 (S50a), checks whether the switching is from 2D to 3D (S50b), waits for a notification of completion of 3D graphics drawing (described later) from the program (S50c) in the case of the switching from 2D to 3D, and notifies the output control portion 70 of the completion of the 3D graphics drawing (S50d) when notified.

Finally, a typical processing flow of the program that is running on the program executing portion 30 when the notification of the 2D-3D control information is performed from the program executing portion 30 will be described with reference to FIG. 9.

The program retains the current 2D/3D state as an internal state and checks whether the current state is 2D (S60a) first. In the case of 2D, the program further checks whether or not the switching to 3D based on the 2D-3D control information given from the program executing portion 30 (i.e., the AV reproducing portion 40) (S60b). In the case of the switching to 3D, the program updates the internal state to 3D (S60c), initializes the right graphics plane 120b (S60d), and then draws the initial state for the right graphics plane 120b (S60e) and the program notifies the program executing portion 30 of the completion of the 3D graphics drawing (completion of 3D graphics output preparation) (S60f) after the completion of the drawing of the initial state in the back buffer of the right graphics plane 120b. As a result, the notification of the completion of 3D graphics drawing is given to the output control portion 70 from the program executing portion 30 as depicted in FIG. 8.

In other cases, the internal state is updated as needed (S60g, S60h).

Figure 7:
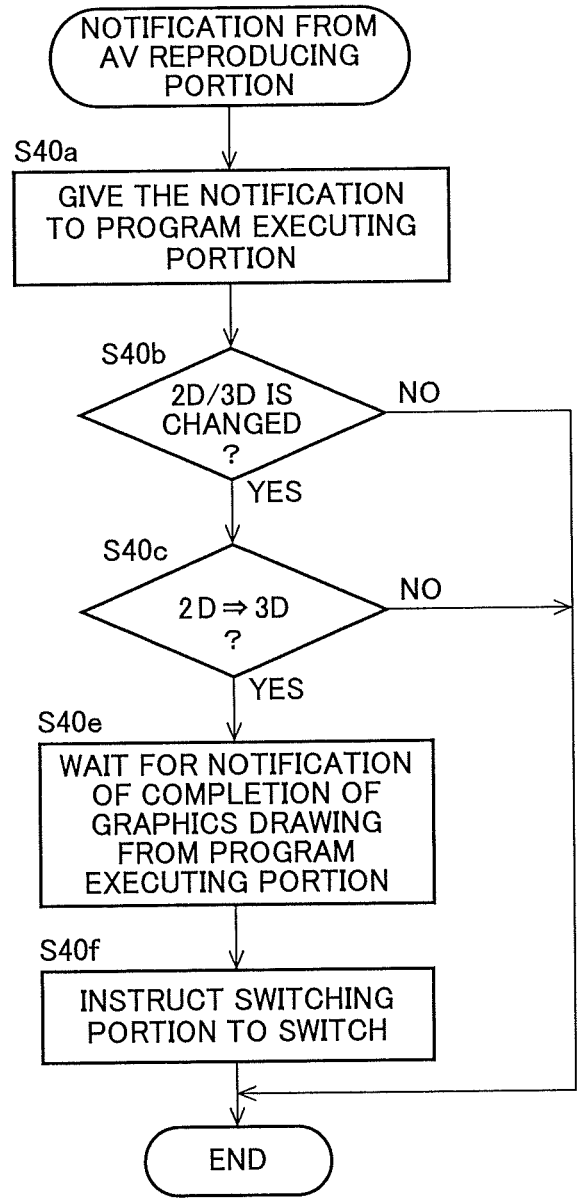
FIG. 7 is a flowchart of a processing flow of an output control portion when a 2D<->3D notification arrives from the AV reproducing portion in the first embodiment of the present invention.
Figure 8:
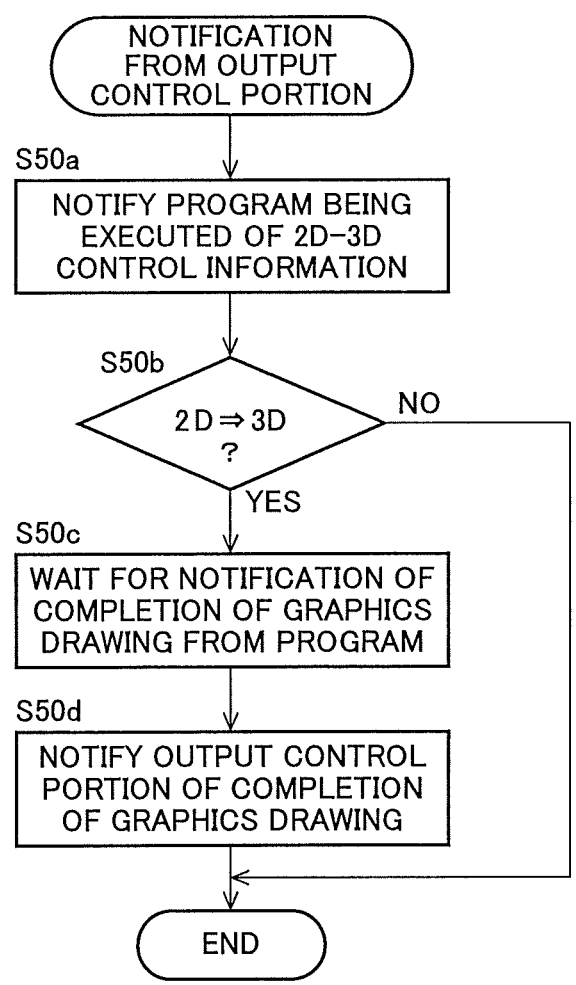
FIG. 8 is a flowchart of a processing flow of the program executing portion when a 2D<->3D notification arrives from the output control portion in the first embodiment of the present invention.
Figure 9:
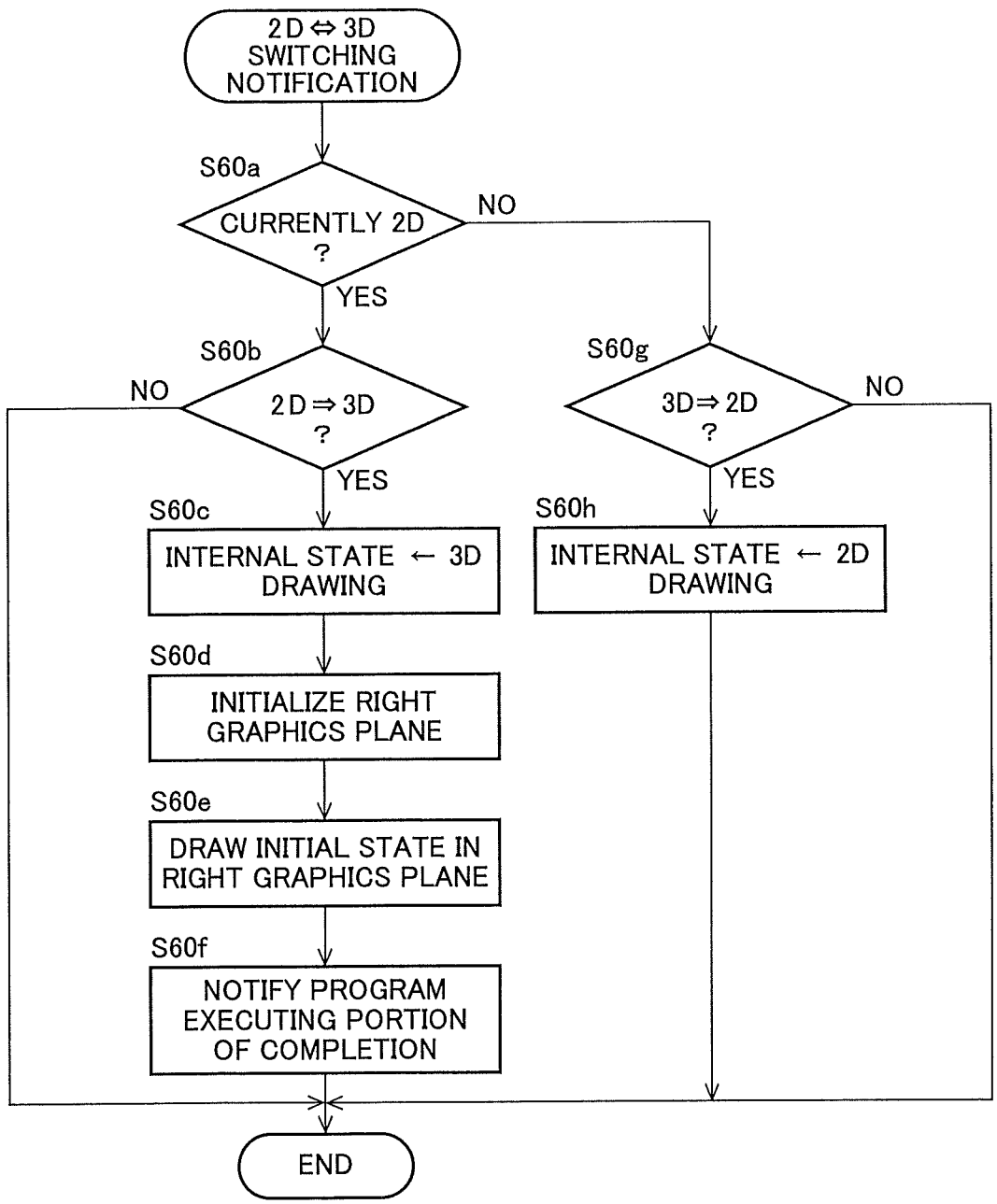
FIG. 9 is a flowchart of a typical processing flow of a program being executed when a 2D<-><->3D notification arrives in the first embodiment of the present invention.

By executing the processing of FIGS. 7 to 9, when reproduction data is changed from 2D image data to 3D image data, in other words, when 2D reproduction is switched to 3D reproduction, the output control portion 70 confirms that the 3D drawing is completed by the program being executed by the program executing portion 30, and then controls the switching portion 80 to switch the output to the right video output portion 90b from the combined image (video) from the left video combining portion 100a to the video of the right video combining portion 100b. Therefore, only after the right graphics plane 120b becomes displayable (the output from the front buffer of the right graphics plane 120a becomes available), the switching can be performed. As a result, the video image and the graphic image are concurrently switched from 2D to 3D reproduction.

<Variations>

Although contents are recorded in the optical disc in this embodiment, this is not a limitation of the present invention and the present invention is applicable to various recording mediums such as a hard disc and a flash memory and is also applicable to broadcast and streaming over the internet. When the present invention is applied to streaming, the 2D-3D control information is combined into a stream.

The 2D-3D control information of AV data is managed by a playlist separated from the AV data in this embodiment and, while the same function can be implemented by combining the information into the AV data, the information related to 2D-3D can be known before actual reproduction and additional effects can be implemented such as provision of information to a user, by storing the information in the play list.

Second Embodiment

Another embodiment of the present invention will hereinafter be described with reference to FIG. 1 based on FIGS. 10 to 13. A difference from the first embodiment is that an advance notification of switching is given in advance from the AV reproducing portion in the case of switching from 2D to 3D such that when a clip file of video is switched from 2D to 3D, a video image can be reproduced in 3D along with a graphic image from the beginning of the clip file. For the convenience of description, the members having the same functions as those described in the first embodiment are denoted by the same reference numerals and will not be described. The terms defined in the first embodiment are also used in compliance with the definition in this embodiment unless otherwise stated.

<Overall System Configuration>

This is common with FIG. 1 and will not be described.

<File Directory Configuration>

This is common with FIG. 2 and will not be described.

<Management Information File>

With regard to the playlist file and the title information file, the title information file is common with FIG. 3(A) and will not be described.

FIG. 10 is an explanatory diagram of a data configuration of the playlist file in this embodiment. Although similar to the first embodiment, a difference is that a field called PrepTime [i] is prepared for each clip making up a playlist.

PrepTime [i] indicates a time (expected reproduction time) of the ith clip file required for the program executing portion 30 to generate (draw) graphics of one screen. For example, if PrepTime [i] indicates T1 (time) and the reproduction is switched from 2D to 3D at an nth clip file, the video disc player of this embodiment starts drawing graphics for the right graphics plane 120b the T1 time before the reproduction termination time of an (n−1)th clip file. As a result, the drawing of graphics of one screen is completed in the right graphics plane 120b at the start time of the nth clip file and, therefore, the video image and the graphic image are concurrently reproduced in 3D at the time of reproduction of the nth clip file from the beginning of the clip file.

PrepTime [i] (PrepTime [0]) of a first clip file in the playlist is used as follows. If PrepTime [0] indicates T2 (time), the video disc player of this embodiment starts drawing graphics before the start of decoding of the playlist and starts decoding the first clip file in the playlist after the T2 time elapses from the drawing start time. As a result, the drawing of the graphics of one screen is completed after the T2 time elapses and the video image can be reproduced along with the graphic image from the beginning of the first clip file.

A value of the field PrepTime [i] is set by a content creator based on the estimation of the time required to prepare 3D graphics in the program executing portion 30. This is because only the content creator knows how complicated the process required for the preparation is.

<Overall Process>

Figure 4:
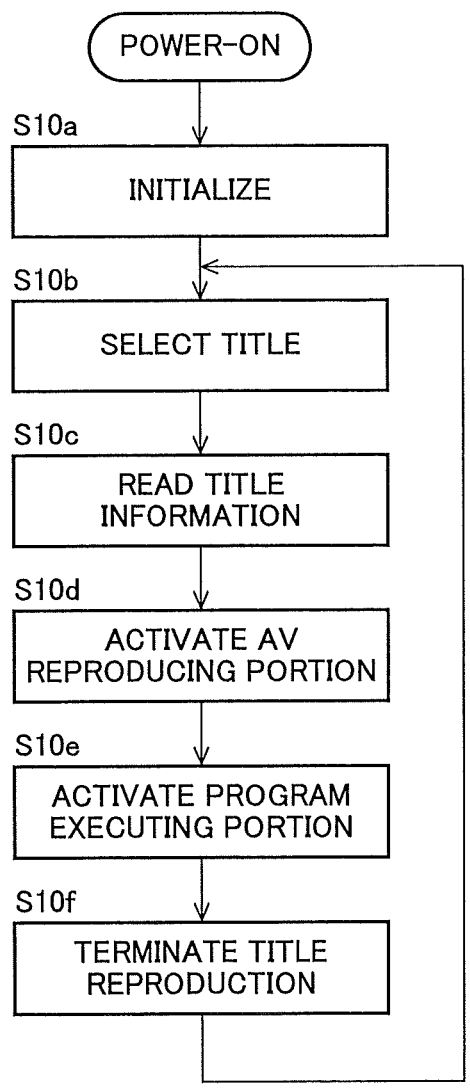
FIG. 4 is a flowchart of an overall processing flow of an overall control portion in the first embodiment of the present invention.

This is common with FIG. 4 and will not be described.

<Program Executing Process>

Figure 5:
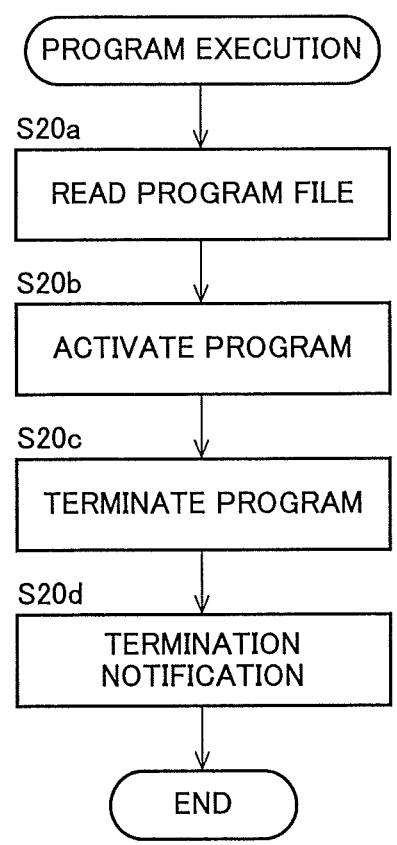
FIG. 5 is a flowchart of a flow of a program execution processing by a program executing portion in the first embodiment of the present invention.

This is common with FIG. 5 and will not be described.

<Playlist Reproducing Process>

Figure 11:
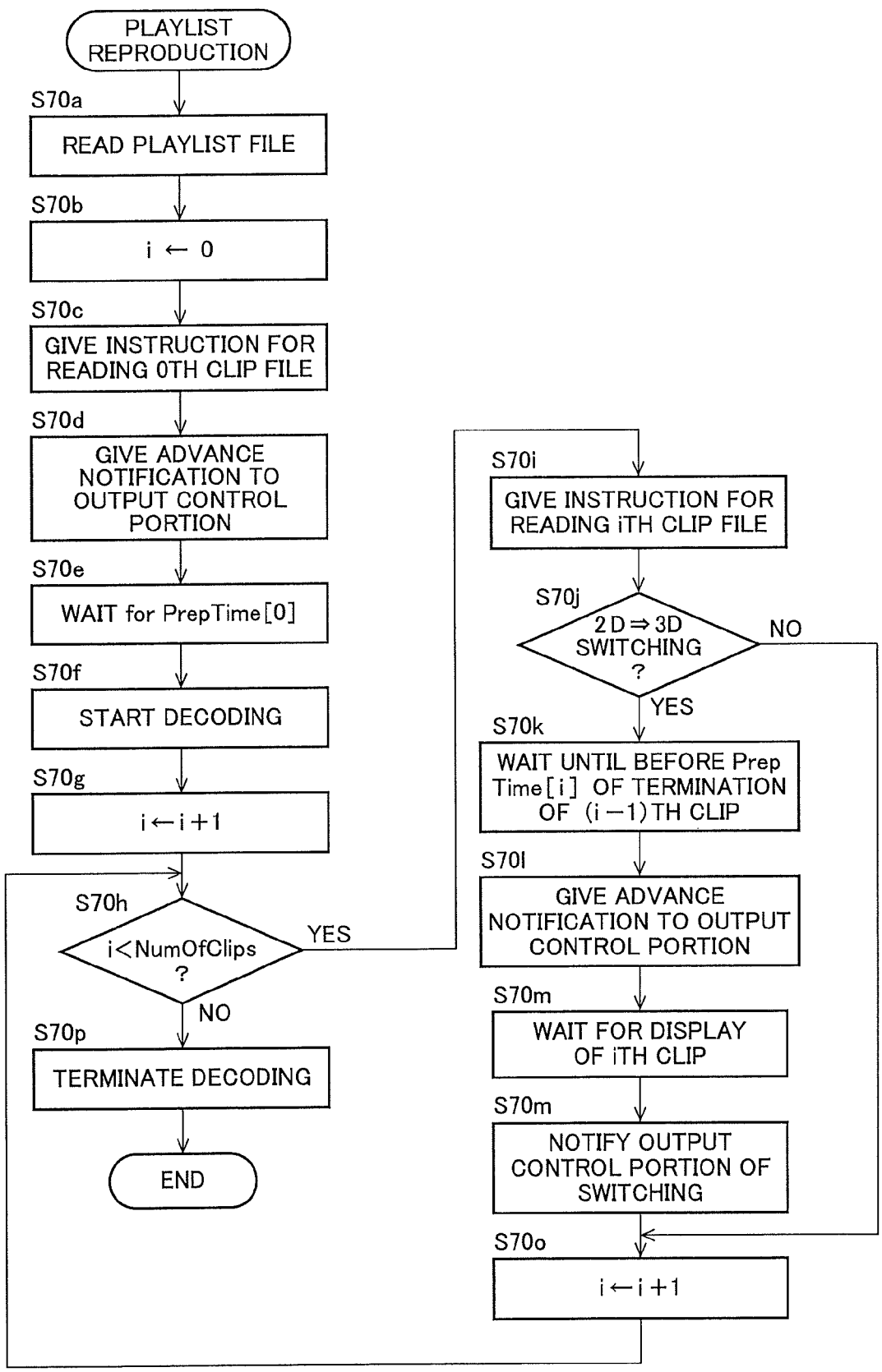
FIG. 11 is a flowchart of a flow of a playlist reproduction processing by the AV reproducing portion in the second embodiment of the present invention.

FIG. 11 is an explanatory diagram of a flow of a playlist reproducing process by the AV reproducing portion 40 in this embodiment.

The AV reproducing portion 40 reads a playlist file specified by the overall control portion 50 through the data acquiring portion 20 from the optical disc 10 (S70a) to interpret the contents.

The AV reproducing portion 40 initializes a variable i, i.e., an index of a clip to be read to zero (S70b) and starts reading the clip file specified by the field ClipFileName [0] from the optical disc 10 (S70c).

The AV reproducing portion 40 refers to the 2D-3D control information specified by the field Dimension [0], notifies the output control portion 70 of the 2D-3D control information (S70d), and waits for a time specified by PrepTime (S70e).

Subsequently, decoding is started (S70f), and the decoded video is output only to the left video plane 110a if the data is 2D image data (in the case of the 2D reproduction) and to both the left video plane 110a and the right video plane 110b if the data is 3D image data (in the case of the 3D reproduction). The variable i, i.e., the index of a clip to be read is incremented (S70g).

While the index i is equal to or greater than one and less than the number of clips in this playlist (i<NumOfClips) (while S70h is YES), the following processing is executed.

The AV reproducing portion 40 starts reading the clip file specified by the field ClipFileName [i] from the optical disc 10 (S70i) to sequentially decode the read data.

The AV reproducing portion 40 refers to the 2D-3D control information specified by the field Dimension [i] to determine whether the switching is from 2D to 3D (S70j), and waits until the time when it is before the termination of the display of the (i−1)th clip by the time specified by PrepTime [i] (S70k) to notify the output control portion 70 of the 2D-3D control information (S70l) in the case of the switching from 2D to 3D. Subsequently, the AV reproducing portion 40 waits for the start of the display of the ith clip (S70m), transmits a switching notification to the output control portion 70 when started (S70n), and increments i (S70o) and the process jumps to step S70h.

If i is equal to or greater than the number of clips at step S70i (i≥NumOfClips), a termination notification is given to the overall control portion 50 after the termination of decoding of the currently decoded clip (S70p).

If the switching is not from 2D to 3D at step S70j, the following processing is executed although not depicted. If the dimension of reproduction is not changed, the AV reproducing portion 40 increments i and the process jumps to step S70h. In the case of the switching from 3D to 2D, the AV reproducing portion 40 notifies the output control portion 70 of the 2D-3D control information after the display start time of the ith clip comes, transmits a switching notification to the output control portion 70, and increments i (S70o) and the process jumps to step S70h.

<2D-3D Switching Processing>

The processing of the output control portion 70 at the time of switching between 2D and 3D will be described with reference to FIG. 12. The program executing portion 30 and the processing of the program executed by the program executing portion 30 are common with the first embodiment and will not be described.

Figure 12:
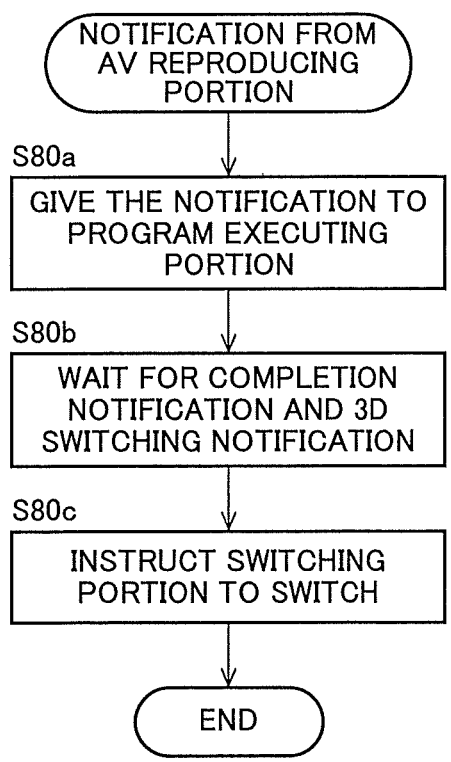
FIG. 12 is a flowchart of a processing flow of the output control portion when an advance notification arrives from the AV reproducing portion in the second embodiment of the present invention.

FIG. 12 is a flowchart of a processing flow of the output control portion 70 when receiving the 2D-3D control information from the AV reproducing portion 40 in this embodiment.

When receiving the 2D-3D control information, as is the case with the first embodiment, the output control portion 70 checks and compares the 2D-3D control information with the current state to determine whether the switching is from 2D to 3D.

In the case of the switching from 2D to 3D, the output control portion 70 updates the internal state to 3D and first notifies the program executing portion 30 of the 2D-3D control information (S80a).

The output control portion 70 waits for a notification of the completion of the 3D graphics drawing from the program and a switching notification from the AV reproducing portion (S80b) and surely recognizes the arrival of the both notifications before controlling the switching portion 80 to switch the output to the right video output portion 90b from the video of the left video combining portion 100a to the video of the right video combining portion 100b.

In the cases other than the switching from 2D to 3D, the internal state is updated as needed.

The description has been made of the case that graphics are only switched from 2D to 3D without changing the contents thereof at the time of the switching from 2D to 3D, the case of changing the contents of the left graphics can also be supported at the time of the switching to 3D.

Specifically, a program may be created such that the drawing is started in the back buffers of the right graphics plane 120a and the left graphics plane 120b in response to the notification of the 2D-3D control information in the case of the switching from 2D to 3D (advance notification of the switching from 2D to 3D) and that the contents of the back buffer is transferred to the front buffer in response to the switching notification from the AV reproducing portion 40 (3D switching notification).

Figure 13:
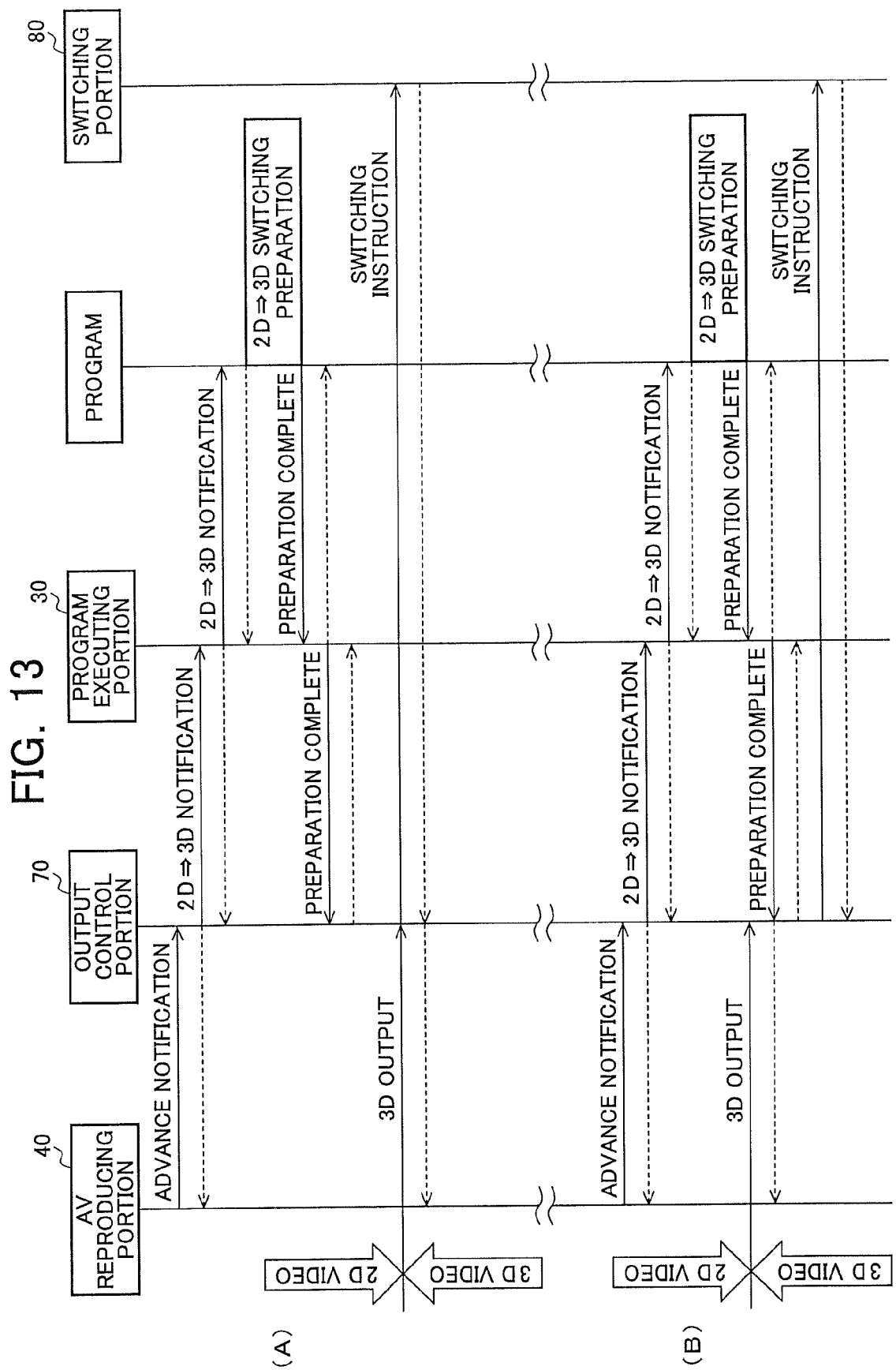
FIG. 13 is a sequence diagram of communication among main functional blocks at the time of switching from 2D to 3D in the second embodiment of the present invention.

FIG. 13 is a sequence diagram summarizing the exchange among the functional blocks. FIG. 13(a) depicts the case that the 3D graphics preparation processing of the program executing portion 30 is terminated before the video decoded by the AV reproducing portion 40 is changed from 2D to 3D, which is the expected behavior. In contrast, FIG. 13(b) depicts the case that the 3D graphics preparation processing is prolonged due to garbage collection of Java (registered trademark) VM etc. In this case, the display to a user is switched to 3D after the video decoded by the AV reproducing portion 40 is changed from 2D to 3D; however, the output control portion 70 performs the switching after receiving the notification of the completion of the 3D graphics drawing; and, therefore, the video image can be reproduced in 3D concurrently with the graphic image although the beginning of the video image is already passed.

Because of the management information in the optical disc 10 and the cooperation among the processing portions as described above, when video is switched from 2D to 3D, the preparation of 3D graphics can be completed in advance and graphics are switched to 3D at the same time as video data switches from 2D to 3D, thereby enabling timely 3D presentation to a user.

Since a content creator specifies a preparation time necessary for switching from 2D to 3D (expected generation time), the content creator can predict a section that generates a process overhead associated with the 3D drawing, which enables higher-quality content creation. This is because a period of performance deterioration can be minimized although images must be prepared and written into both the left graphics plane 120a and the right graphics plane 120b in the case of the 3D drawing and a memory bandwidth consumption associated with drawing is doubled between the program executing portion 30 and the graphics planes as compared to the 2D drawing, leading to performance deterioration even if the same contents are drawn.

In other words, if no information exists about a preparation time for switching from 2D to 3D specified by a content creator, the video disc player is unable to know the time required for the drawing in the right graphics plane and, therefore, the drawing into the right graphics plane must be started earlier so as to ensure that the drawing in the right graphics plane is completed before the switching to 3D; however, since the drawing may be started at appropriate timing if the preparation time is specified, the performance can be prevented from deteriorating due to starting the drawing into the right graphics plane earlier.

<Variation>

Although the timing of advance notification is specified in terms of time in this embodiment, the timing may obviously be specified by anything such as the number of steps, process contents, etc., as long as a time or a process amount required for preparation can be estimated.

Although contents are recorded on the optical disc in this embodiment, this is not a limitation of the present invention and the present invention is applicable to various recording mediums such as a hard disc and a flash memory and is also applicable to broadcast and streaming over the internet. When the present invention is applied to streaming, the 2D-3D control information is multiplexed and transmitted with a stream to be streamed, and information alternative to Prep-Time [i] of this embodiment may be multiplexed PrepTime before a video signal is changed to 3D.

Although the timing of the advance notification of the switching from 2D to 3D (i.e., notification of instruction for starting the graphics drawing in the case of switching from 2D to 3D) is determined based on the time information related to the expected generation time of graphics of one screen acquired from the data in the optical disc 10 in this embodiment, this is not a limitation of the present invention. For example, a content creator may be obliged to complete the drawing to the graphics planes within a predetermined time, and the predetermined time may be stored in the player before shipping, etc., such that the graphics drawing processing is started the predetermined time earlier. Alternatively, the player may determine the expected generation time of graphics of one screen based on actual contents to start the graphics drawing process in advance with a margin.

First Reference Example

Figure 14:
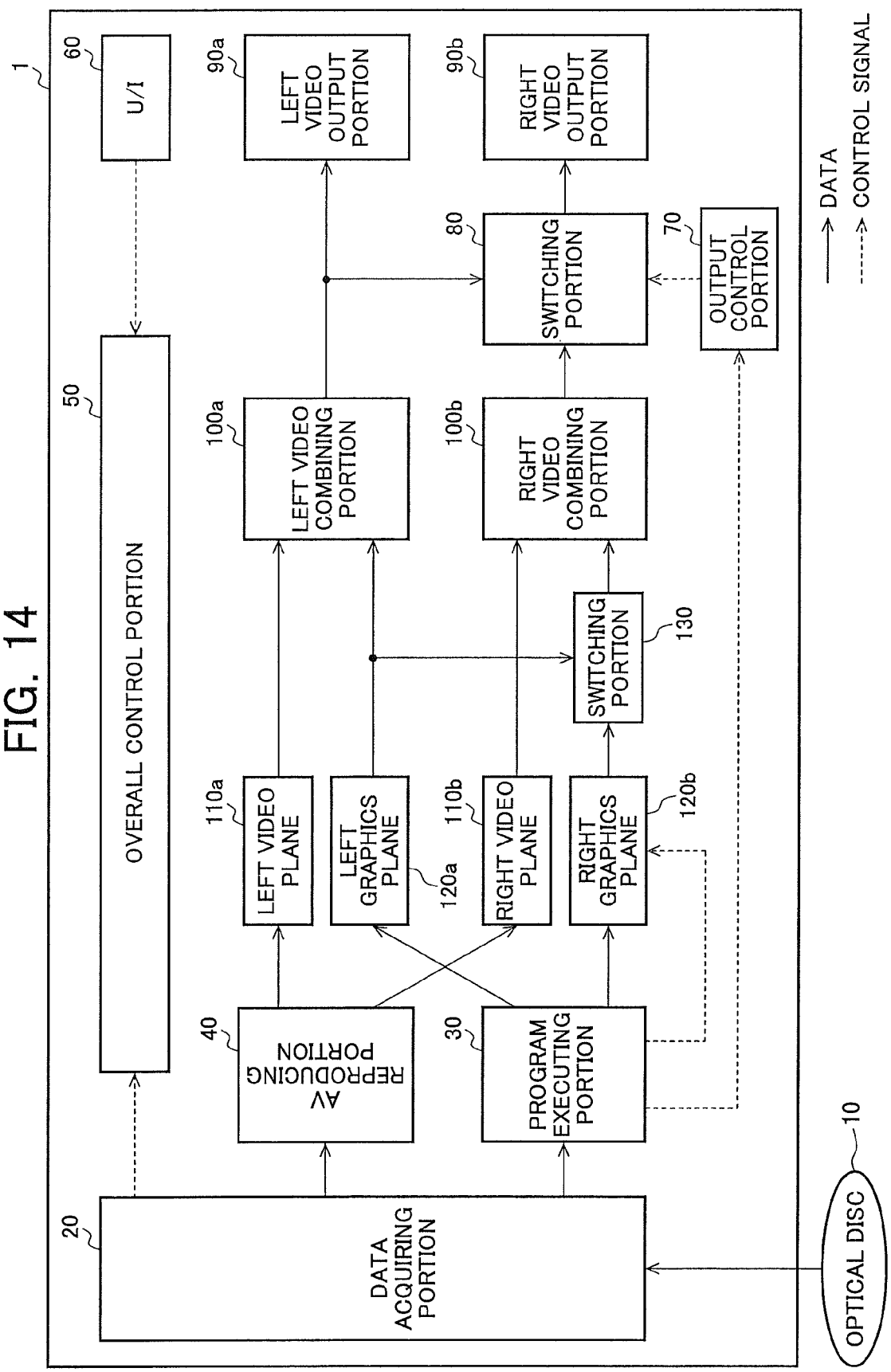
FIG. 14 is a block diagram of a general configuration in a first reference example.

A content reproducing apparatus of a reference example will hereinafter be described with reference to FIG. 14. A difference from FIG. 1 depicting the first embodiment is addition of a switching portion 130 that switches the output to the right video combining portion 100b between the output of the right graphics plane 120b and the output of the left graphics plane 120a in accordance with instruction from the program executing portion. This enables the improvement of performance in combination of 3D AV data and 2D graphics as described later. For the convenience of description, the members having the same functions as those described in the first embodiment are denoted by the same reference numerals and will not be described. The terms defined in the first embodiment are also used in compliance with the definition in this embodiment unless otherwise stated.

<Overall System Configuration>

Only a difference from FIG. 1 will be described with reference to FIG. 14.

As described above, the switching portion 130 is added between the right graphics plane 120b and the right video combining portion 100b.

The switching portion 130 switches the output to the right video combining portion 100b between the output of the right graphics plane 120b and the output of the left graphics plane 120a in accordance with instruction from the program executing portion 30.

The program executing portion 30 includes an interface that can give an instruction for the switching to the switching portion 130 and provides API (Application Program Interface) capable of controlling the switching for a program to be executed.

<File Directory Configuration>

This is common with FIG. 2 and will not be described.

<Management Information File>

This is common with FIG. 3 and will not be described.

<Overall Processing>

This is common with FIG. 4 and will not be described.

<Program Executing Processing>

This is common with FIG. 5 and will not be described.

<Playlist Reproducing Processing>

Figure 6:
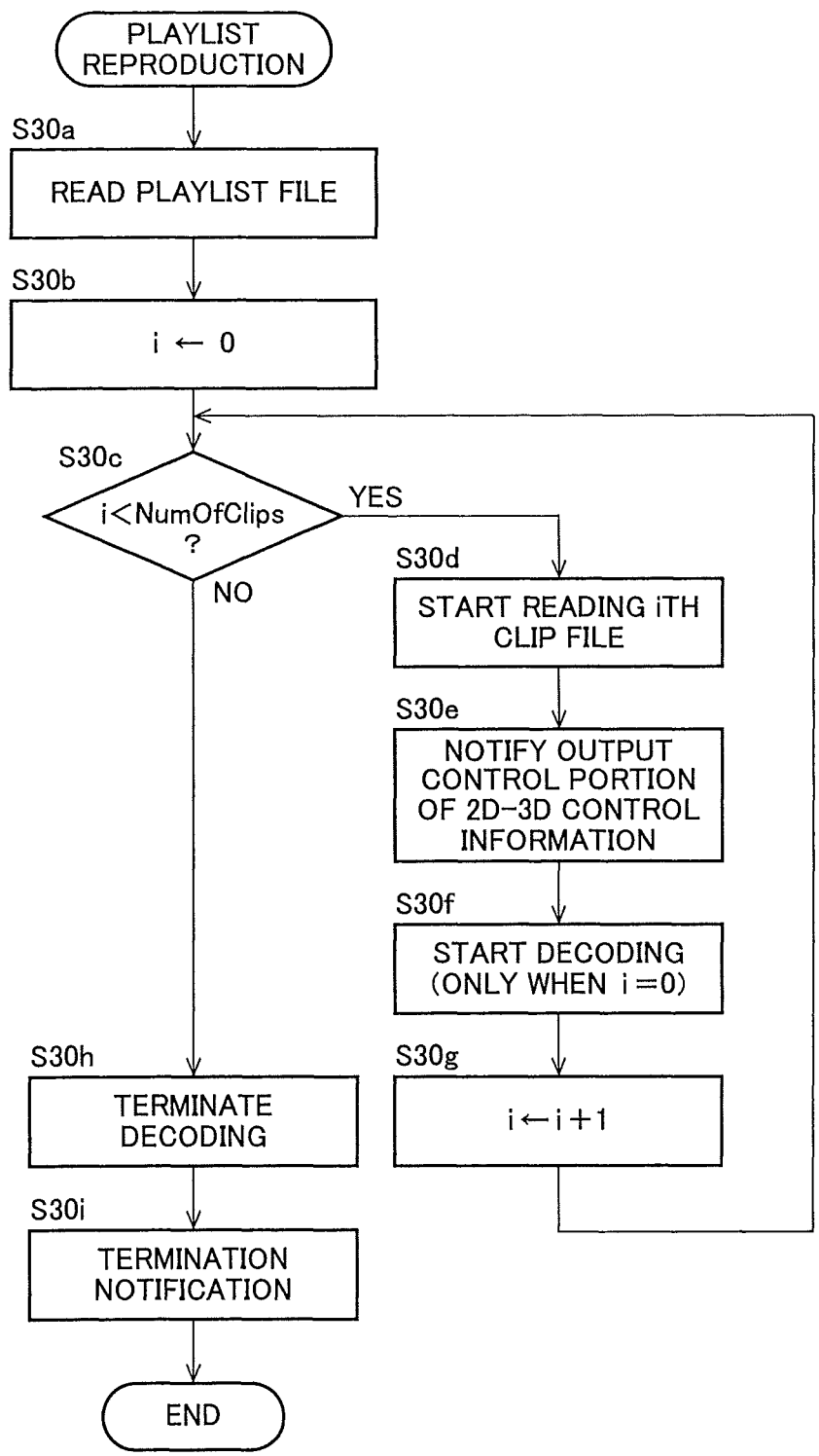
FIG. 6 is a flowchart of a flow of a playlist reproduction processing by an AV reproducing portion in the first embodiment of the present invention.

This is common with FIG. 6 and will not be described.

<2D-3D Switching Processing>

A difference from the first embodiment is a program executed on the program executing portion 30.

If it is desired to display graphics in 3D when AV data is 3D, API is called that switches an image output by the switching portion 130 to that of the right graphics plane 120b between S60b and S60c of the flowchart of FIG. 9.

On the other hand, if it is desired to display graphics in 2D even when AV data is 3D, API is called that switches an image output by the switching portion 130 to that of the left graphics plane 120a between S60b and S60c of the flowchart of FIG. 9, and the processing of S60c and that of S60d are not executed.

Since the switching portion 130 is included that switches the input graphics plane and the program executing portion 30 includes API for the switching, 3D AV data and 2D graphics can be combined.

This provides an option for a content creator that only graphics are set to 2D when a graphics display speed is necessary. As described above, this is because performance deterioration can be minimized although images must be prepared and written into both the left graphics plane 120a and the right graphics plane 120b in the case of the 3D drawing and a memory bandwidth consumption associated with drawing is doubled between the program executing portion 30 and the graphics planes as compared to the 2D drawing, leading to performance deterioration even if the same contents are drawn.

Second Reference Example

Figure 15:
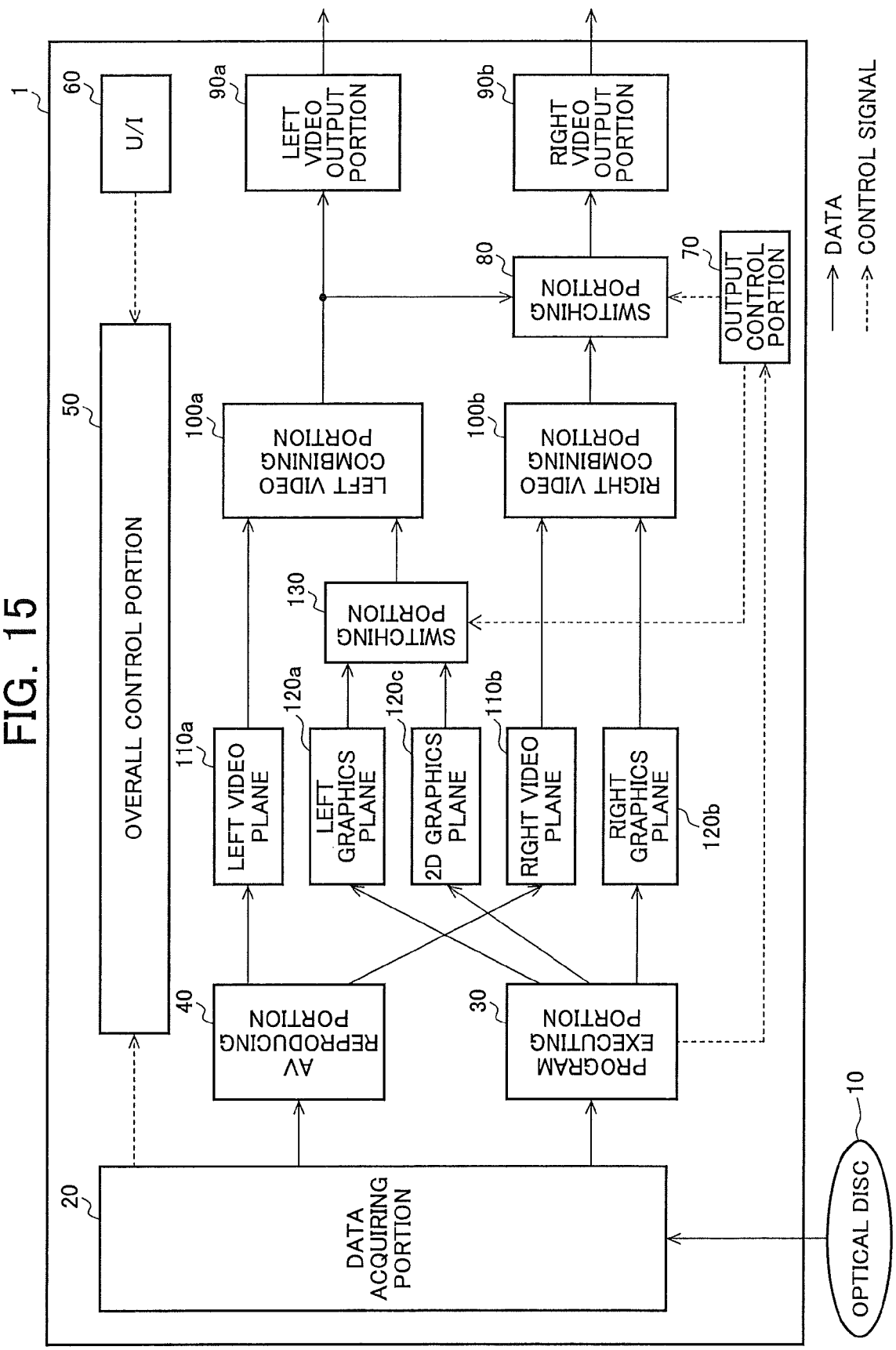
FIG. 15 is a block diagram of a general configuration in a second reference example.

A content reproducing apparatus of a second reference example will hereinafter be described with reference to FIG. 15. Differences from FIG. 1 depicting the first embodiment are addition of a 2D graphics plane 120c and addition of a switching portion 130 that switches the input to the left video combining portion 100a between the left graphics plane 120a and the 2D graphics plane 120e based on a control signal from the output control portion 70. This eliminates the need for the back buffer prepared by a program and necessary for the first embodiment in preparation for the case that the contents are changed between before and after the switching between 2D and 3D. For the convenience of description, the members having the same functions as those described in the first embodiment are denoted by the same reference numerals and will not be described. The terms defined in the first embodiment are also used in compliance with the definition in this embodiment unless otherwise stated.

<Overall System Configuration>

Only differences from FIG. 1 will be described in terms of the overall system configuration of this reference example with reference to FIG. 15.

As described above, the 2D graphics plane 120c is added, and the switching portion 130 is added that switches the input to the left video combining portion 100a between the left graphics plane 120a and the 2D graphics plane 120c based on a control signal from the output control portion 70.

The program executing portion 30 writes the generated drawing not only into the left graphics plane 120a and the right graphics plane 120b but also into the 2D graphics plane 120c depending on contents of the program.

<File Directory Configuration>

This is common with FIG. 2 and will not be described.

<Management Information File>

This is common with FIG. 3 and will not be described.

<Overall Processing>

This is common with FIG. 4 and will not be described.

<Program Executing Processing>

This is common with FIG. 5 and will not be described.

<Playlist Reproducing Processing>

This is common with FIG. 6 and will not be described.

<2D-3D Switching Processing>

The processing in this video disc player 1 at the time of switching between 2D and 3D (a process after the notification of the 2D-3D control information from the AV reproducing portion 40), more specifically, the processing flows of the output control portion 70, the program executing portion 30, and the program executed by the program executing portion 30 will be described with reference to FIGS. 16 to 18. The processing is almost the same as the first embodiment, and "S" of the corresponding step reference numerals of the first embodiment is replaced with "S1" in the reference numerals denoting steps so as to represent the correlation (e.g., S40a→S140a).

First, a processing flow of the output control portion 70 will be described when the notification of the 2D-3D control information is performed from the AV reproducing portion 40 with reference to FIG. 16.

The output control portion 70 notifies the program executing portion 30 of the 2D-3D control information received from the AV reproducing portion 40 without change (S140a).

The output control portion 70 manages the current 2D/3D state and refers to the field Dimension [i] of the received 2D-3D control information to check whether the 2D/3D state is changed (S140b). If changed, the output control portion 70 waits for a notification of completion of drawing described later from the program executing portion 30 (S140e).

If the notification of completion of drawing is given, in the case of switching from 2D to 3D, the output control portion 70 controls the switching portion 80 to switch the output to the right video output portion 90b from video of the left video combining portion 100b to video of the right video combining portion 100b and controls the switching portion 130 to switch the output to the left video combining portion 100a from the 2D graphics plane 120c to the left graphics plane 120a (S140f). In the case of switching from 3D to 2D, the outputs are inversely switched.

Figure 17:
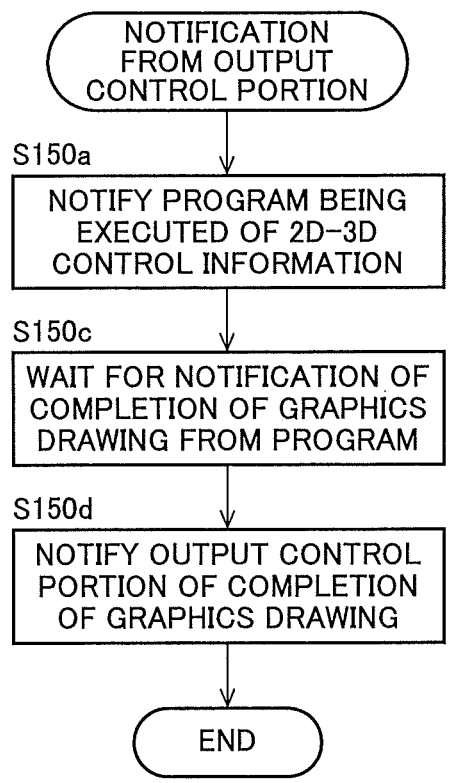
FIG. 17 is a flowchart of a processing flow of the program executing portion when a 2D<->3D notification arrives from the output control portion in the second reference example.

A processing flow of the program executing portion 30 will then be described when the notification of the 2D-3D control information is performed from the output control portion 70 with reference to FIG. 17.

The program executing portion 30 notifies the program being executed by the program executing portion 30 of the 2D-3D control information given from the output control portion 70 (S150a), waits for a notification of completion of the graphics drawing described later from the program (S150c), and notifies the output control portion 70 of the completion of the graphics drawing (S150d) when notified.

Figure 18:
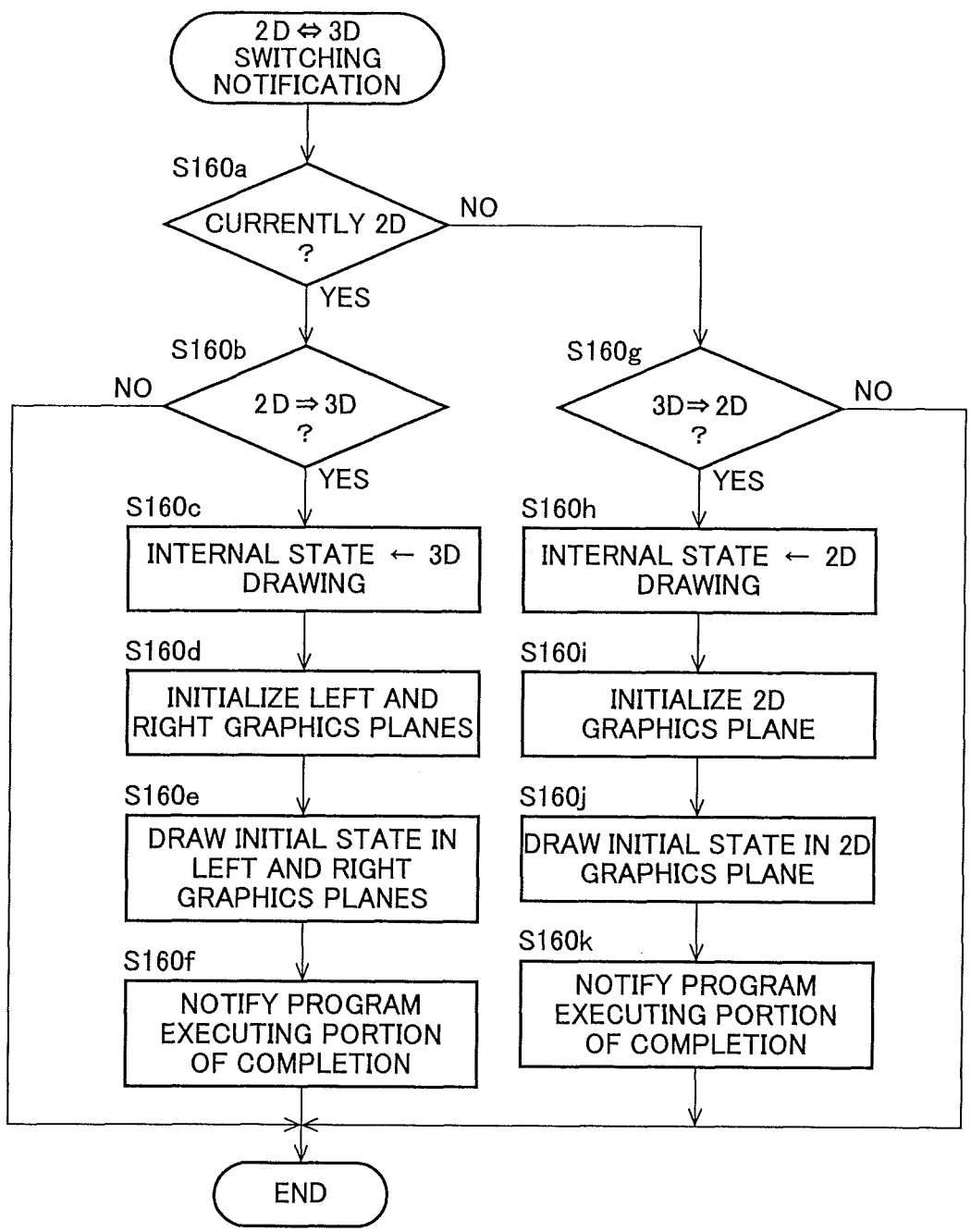
FIG. 18 is a flowchart of a typical processing flow of a program being executed when a 2D<->3D notification arrives in the second reference example.
Figure 19:
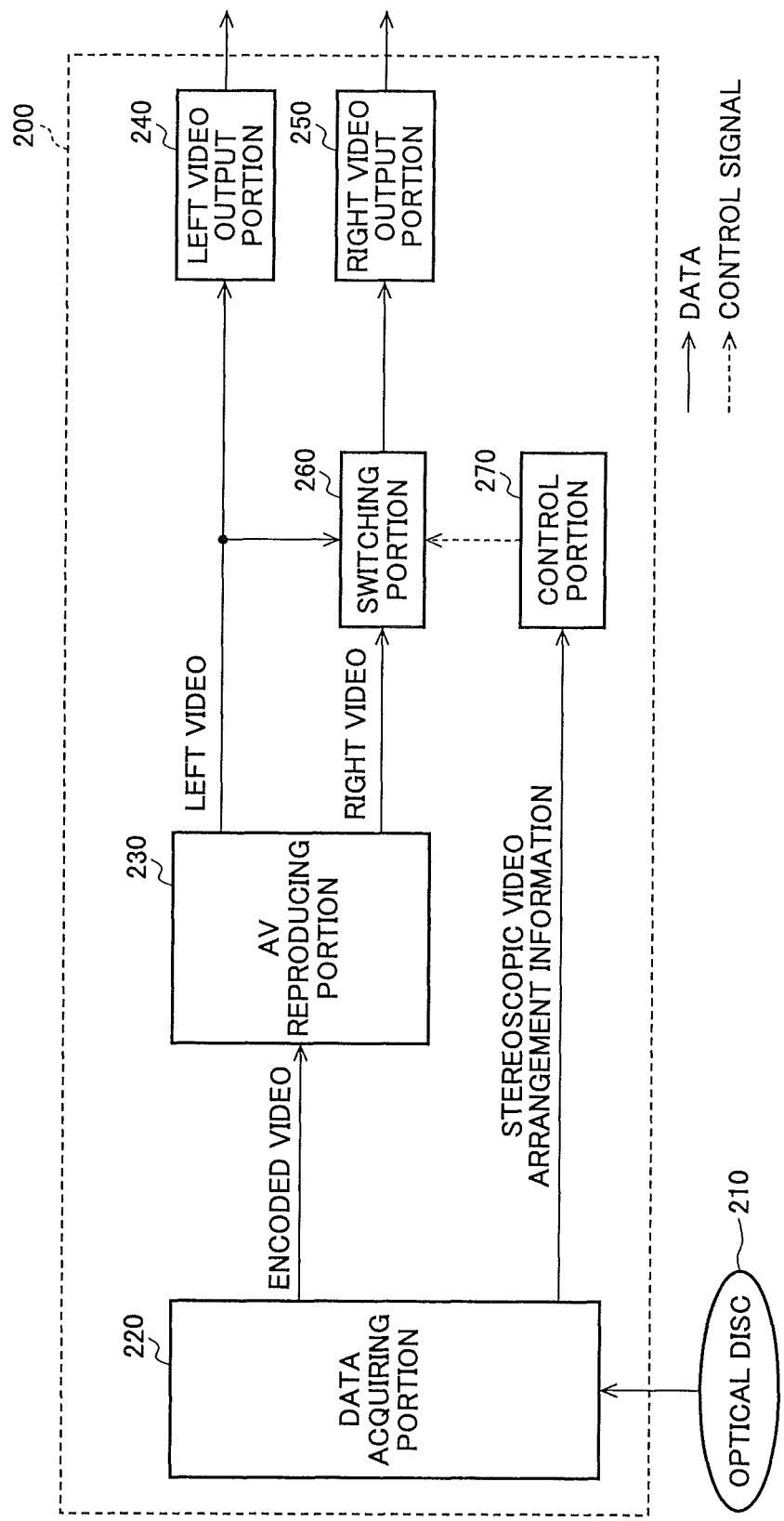
FIG. 19 is a block diagram of a general configuration in a conventional technology.

A typical processing flow of the program being executed by the program executing portion 30 will lastly be described when the notification of the 2D-3D control information is performed from the program executing portion 30 with reference to FIG. 18.

The program retains the current 2D/3D state as an internal state and first checks whether the current state is 2D (S160a). In the case of 2D, the program further checks whether the switching to 3D is performed, based on the 2D-3D control information given from the program executing portion 30 (i.e., the AV reproducing portion 40) (S160b). In the case of the switching to 3D, after updating the internal state to 3D (S160c) and initializing the graphics planes 120b, 120c (S160d), the program draws the initial state for the graphics planes 120b, 120c (S160e) and, after the completion of the drawing of the initial state in the back buffers of the graphics planes 120b, 120c, the program notifies the program executing portion 30 of the completion of the graphics drawing (completion of graphics output preparation) (S160f). As a result, the notification of the completion of graphics drawing is given to the output control portion 70 from the program executing portion 30 as depicted in FIG. 17.

On the other than, if the current state is 3D, the program determines whether the switching to 2D is performed based on a 2D-3D control signal (S160g). In the case of the switching to 2D, after updating the internal state to 2D (S160h) and initializing the 2D graphics plane 120c (S160i), the program draws the initial state for the plane 120c (S160j) and, after the completion, the program notifies the program executing portion 30 of the completion of the graphics drawing (completion of graphics output preparation) (S160k). As a result, the notification of the completion of graphics drawing is given to the output control portion 70 from the program executing portion 30 as depicted in FIG. 17.

Figure 16:
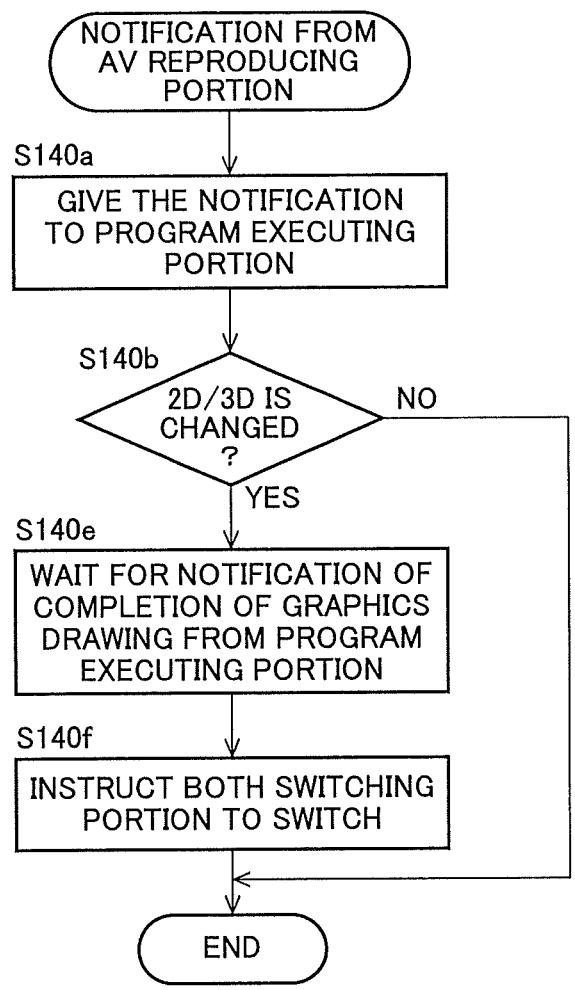
FIG. 16 is a flowchart of a processing flow of the output control portion when a 2D<->3D notification arrives from the AV reproducing portion in the second reference example.

By executing the processing of FIGS. 16 to 18, as is the case with the first embodiment, the video image and the graphic image can concurrently be switched from 2D reproduction to 3D reproduction and from 3D reproduction to 2D reproduction. Additionally, this eliminates the need for the back buffer that must be prepared for the case that the contents are changed between before and after the switching between 2D and 3D.

The plane configuration as in this reference example is obviously applicable when an advance notification is given as in the second embodiment.

[Variations Common to Embodiments and Reference Examples]

Lastly, the blocks of the video disc player 1 may be made up of hardware logics or may be implemented with software by using a CPU as described below. The video disc player 1 includes a CPU (central processing unit) that executes an instruction of a control program that implements functions, a ROM (read only memory) that stores the program, a RAM (random access memory) that deploys the program, a storage device (recording medium) such as a memory that stores the program and various data, etc. An object of the present invention is achievable by supplying the video disc player with a recording medium that records a program code of a control program (an executable format program, an intermediate code program, or a source program) for the video disc player, i.e., software that implements the above functions, in a computer readable manner, and by reading and executing the program code recorded in the recording medium with the computer (or CPU and MPU).

The recording medium can be, for example, a tape system such as a magnetic tape or a cassette tape, a disc system including a magnetic disc such as a floppy (registered trademark) disc/hard disc and an optical disc such as CD-ROM/MO/MD/DVD/CD-R, a card system such as an IC card (including a memory card)/optical card, or a semiconductor memory system such as a mask ROM/EPROM/EEPROM/flash ROM.

A Video disc player may be configured to be connectable to a communication network and the program code may be supplied through the communication network. This communication network is not particularly limited and is available as the Internet, an intranet, an extranet, a LAN, an ISDN, a VAN, a CATV communication network, a virtual private network, a telephone line network, a mobile communication network, and a satellite communication network, for example. A transmitting medium making up the communication network is not particularly limited and is available as a wired medium such as IEEE 1394, USB, a power-line carrier, a cable TV line, a telephone line, and an ADSL line or a wireless medium such as infrared light in the case of IrDA or a remote controller, Bluetooth (registered trademark), 802.11 wireless transmission, HDR, a portable telephone network, a satellite line, and a digital terrestrial network, for example. The present invention is also implemented in a form of a computer data signal (transmitting medium) that realizes the program code through electronic transmission and that is embedded in a carrier wave.

INDUSTRIAL AVAILABILITY

A content reproducing apparatus of the present invention is preferably utilized for a video disc player etc.

EXPLANATIONS OF LETTERS OR NUMERALS

1 . . . video disc player; 10 . . . optical disc; 20 . . . data acquiring portion; 30 . . . program executing portion; 40 . . . AV reproducing portion; 50 . . . overall control portion; 60 . . . U/I; 70 . . . output control portion; 80 . . . switching portion; 90*a* . . . left video output portion; 90*b* . . . right video output portion; 100*a* . . . left video combining portion; 100*b* . . . right video combining portion; 110*a* . . . left video plane; 110*b* . . . right video plane; 120*a* . . . left graphics plane; and 120*b* . . . right graphics plane.

The invention claimed is:

1. A content reproducing apparatus comprising:
a data acquiring portion that acquires a program and video data from a recording medium;
a first video plane and a second video plane that store video images;
a first graphics plane and a second graphics plane that store graphic images;
a program executing portion that executes the program to generate the graphic images, and outputs the graphic image for 2D (dimension) output to the first graphics plane and the graphic image for 3D output to each of the first and the second graphics planes;
a decoding portion that decodes the video data to output the video image for 2D output to the first video plane and the video image for 3D output to each of the first and the second video planes;
a first combining portion that combines images stored in the first video plane and the first graphics plane;
a switching portion that inputs the graphic image stored in the first graphics plane and the graphic image stored in the second graphics plane and only switches between the graphic images stored in the first and second graphics planes to be output by an instruction from outside, so as to switch to the graphic image stored in the first graphics plane for 2D output or to the graphic image stored in the second graphics plane for 3D output, without switching the video images of the first and second video planes; and
a second combining portion that combines the video image stored in the second video plane and the graphic image output from the switching portion,
wherein the program executing portion transmits the instruction to the switching portion based on a command included in the program.

2. A non-transitory computer readable recording medium recording at least one of the video data and the program so as to supply the at least one of the video data and the program to the content reproducing apparatus as defined in claim 1.

* * * * *